United States Patent [19]
Coll et al.

[11] Patent Number: 5,581,461
[45] Date of Patent: Dec. 3, 1996

[54] COMPUTERIZED SYSTEM AND METHOD FOR STORAGE, PROCESSING AND TRANSFER OF INVENTORY AND OTHER DATA AMONG A CENTRAL PROCESSOR/DATABASE AND A NUMBER OF REMOTE LOCATIONS

[75] Inventors: Denise Coll, Quincy, Mass.; Daniel M. Ouellette, Walnut Creek, Calif.

[73] Assignee: ITT Sheraton Corporation, Braintree, Mass.

[21] Appl. No.: 299,336

[22] Filed: Aug. 31, 1994

Related U.S. Application Data

[63] Continuation of Ser. No. 14,661, Feb. 8, 1993, abandoned.
[51] Int. Cl.⁶ .................................................. G06F 153/02
[52] U.S. Cl. ......................................... 395/205; 395/228
[58] Field of Search ................................. 364/401, 403, 364/406, 407; 395/600, 800, 916, 934, 200, 650; 379/355, 356; 370/80.5, 80.6; 340/825.28

[56] References Cited

U.S. PATENT DOCUMENTS

| | | | |
|---|---|---|---|
| 4,720,849 | 1/1988 | Tayama | 379/90 |
| 4,862,357 | 8/1989 | Ahlstrom et al. | 364/407 |
| 5,021,953 | 6/1991 | Webber et al. | 364/407 |
| 5,187,787 | 2/1993 | Skeen et al. | 395/600 |
| 5,204,949 | 4/1993 | Yasue et al. | 395/200 |
| 5,224,205 | 6/1993 | Dinkin et al. | 395/200 |
| 5,237,499 | 8/1993 | Garback | 364/407 |
| 5,239,662 | 8/1993 | Danielson et al. | 395/800 |
| 5,253,166 | 10/1993 | Dettelbach et al. | 364/407 |
| 5,276,876 | 1/1994 | Coleman et al. | 395/650 |
| 5,317,568 | 5/1994 | Bixby et al. | 370/85.6 |
| 5,327,532 | 7/1994 | Ainsworth et al. | 395/200 |

OTHER PUBLICATIONS

Henderson, Danna, "Getting information, not just data" (Latest from airline reservation industry), Air Transport World, v. 26, n. 8, p. 54(6) Aug. 1989.
"Hilton Hotels Install Micro–to–Mainframe Link", Info-World vol. V8, Issue: n3 p. 17(1) Aug. 1986, Spiegelman.
Brown Hyatt Chain Cuts Over New Global Reservation Network, Journal: Network World, vol: V7, Issue: n41 p.(2), Oct. 1990.

*Primary Examiner*—Donald E. McElheny, Jr.
*Assistant Examiner*—Frantzy Poinvil
*Attorney, Agent, or Firm*—Plevy & Associates

[57] ABSTRACT

A system and method for a novel and highly advanced data handling network which is ideally disposed for the management of inventory data among a number of dispersed locations, such as a hotel chain. A central computer-processor/data-base is interconnected with a plurality of remote locations, via a novel gateway interface and communications network, which remote locations may comprise either local processors and associated local data bases or terminal devices connected with the system via third-party systems or public networks. Embodied as a hotel reservation and data management network, the system supports not only the storage and exchange of basic room-inventory/reservation data between and among the central and remote locations, but also such advanced data management features as a single depleting inventory for both the central and remote databases, rate plan restricted access, and display of room layout data at an operator's terminal.

28 Claims, 4 Drawing Sheets

COMPUTERIZED SYSTEM AND METHOD FOR STORAGE, PROCESSING AND TRANSFER OF INVENTORY AND OTHER DATA AMONG A CENTRAL PROCESSOR/DATABASE AND A NUMBER OF REMOTE LOCATIONS

This is a Continuation application under 37 C.F.R. 1.62 of prior Ser. No 08/014,661 filed on Feb. 8, 1993 now abandoned, entitled A COMPUTERIZED SYSTEM AND METHOD FOR STORAGE, PROCESSING, AND TRANSFER OF INVENTORY AND OTHER DATA AMONG A CENTRAL PROCESSOR/DATABASE AND A NUMBER OF REMOTE LOCATION.

FIELD OF THE INVENTION

This invention relates to a system and method for cooperative processing of data (including storage, retrieval, and interexchange of such data) among a central processor/database and a number of remotely-located processors (including remote databases), and particularly to the application of such a system for the establishment and maintenance of reservation, inventory, and other such records for an affiliated group of hospitality establishments.

BACKGROUND OF THE INVENTION

The last half of the twentieth century, and particularly the last two decades, has been characterized by rapid change in the travel industry, particularly the hospitality segment of that industry. Driven both by scale economies and a desire to nurture and trade upon "brand loyalty" among travelers, hotels and motels have evolved from largely insular, "mom and pop" operations to a preponderance of large chains of hotels and/or motels operating under a common name. Many of such chains have properties widely distributed throughout the United States and overseas as well—e.g., Sheraton, Hilton, Marriott, etc. The various properties comprising such a chain may be commonly owned, independently owned but operating under a common franchise, or some combination of the two.

In general, such chains will have established a common interface point—e.g., an "800" telephone number—for access by the public at large to obtain reservations or other information respecting any of the properties comprising the chain, as well as a common interface for third-party booking agencies, such as travel agents, to establish reservations at various properties in the chain. Because of the magnitude of the data to be managed, such chains will also generally have established a central computerized database where reservations taken through such common interface points are maintained, along with means for communicating specific reservation data to the affected properties.

The present invention takes this data management function to a new, substantially higher level of utility.

SUMMARY OF THE INVENTION

A system is disclosed for managing data shared among a central database and a number of remote databases operative to facilitate the exchange of data, and cooperative processing thereof, among that central database and one or more of the remote databases, and which finds particular utility in the management of reservation and other data for a plurality of hotels operating under a common grouping. Specifically, we disclose a hotel reservation system comprising:

(a) A central computer processor and associated data storage means for storing hotel data, including room availability, customer account and material usage information, for a plurality of hotels;

(b) A plurality of local computer processors and associated data storage means located remotely from the central processor for storing local hotel data;

(c) Communication means for linking the central processor with the plurality of local processors into a network; and (d) Gateway means operative to facilitate cooperative processing among the central processor and the plurality of remote processors and to establish a common interface between application level software operating on the central processor and on the plurality of local processors.

DETAILED DESCRIPTION OF THE INVENTION

Figure 1:
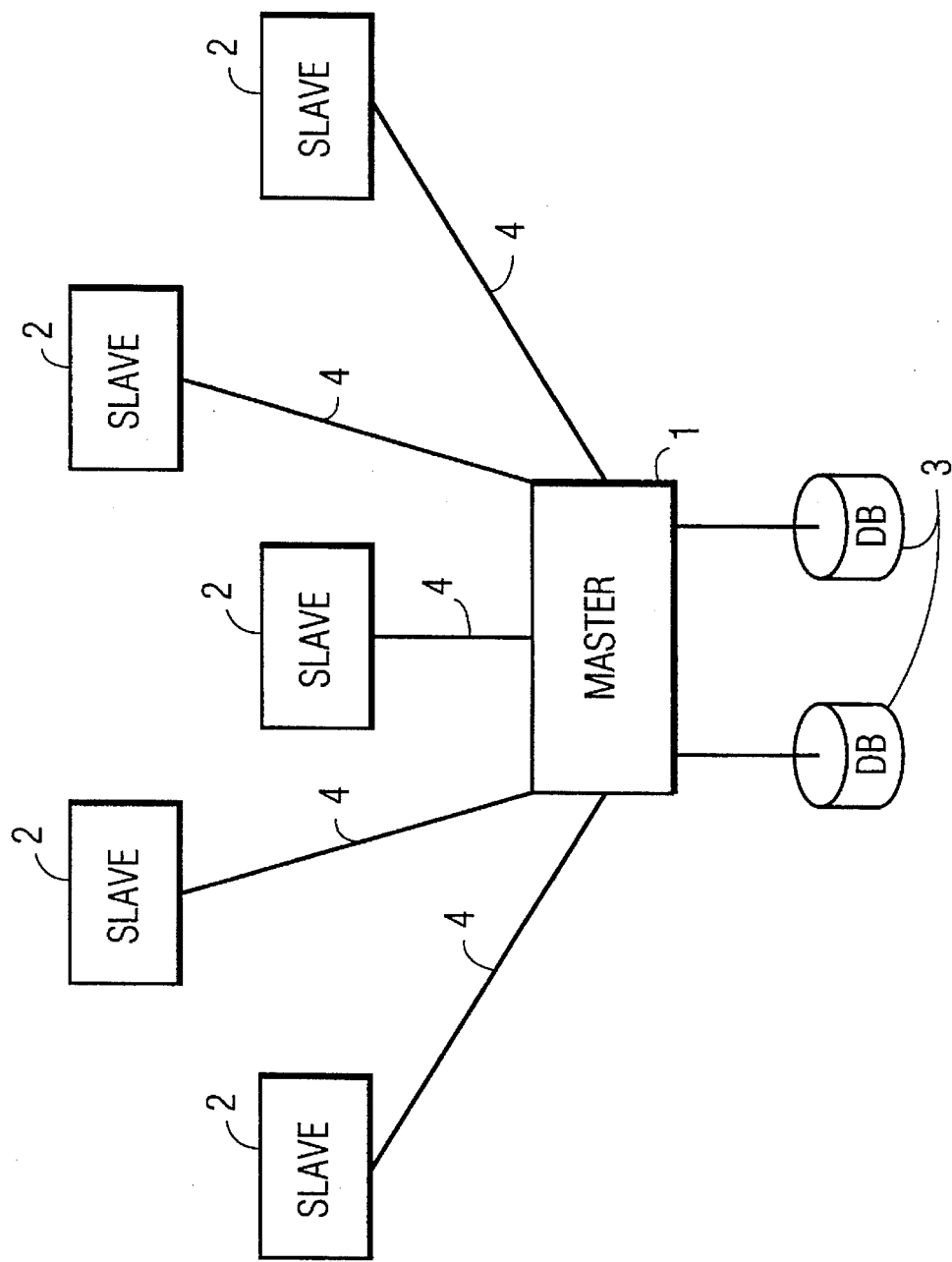
FIG. 1 is a schematic depiction of a prior art system

In FIG. 1, a prior-art configuration of an exemplary system for storing and processing data, such as reservation data for a hotel chain, is shown. As will be seen in that figure, a Master Processor 1 operating in conjunction with Central Database 3 operates to process and store such data. Information of interest to a particular remote site indicated as Slave 2 is communicated to that slave, which may be a mini-computer, micro-computer or terminal, via Link 4. Each of the Slaves 2 may also communicate with Master Processor 1 in order to upload or download information from Central Database 3 via Links 4 in such a master-slave relationship. All data processing and storage is concentrated at the central location (i.e., the combination of Master Processor 1 and Central Database 3) and all application level programs associated with Slaves 4 must conform identically to related application level programs operating at Master Processor 1.

In the system of this invention, a much more flexible architecture is adopted for the interface between a central processor/database and remotely-located processors, which may also have associated databases, thereby permitting a more powerful and more efficient inter-operation of the combined units. An essential element of this invention is a novel gateway interface between a central processor and one or more remote processors, based on the concept of cooperative processing among the interconnected units.

The term "cooperative processing" refers to a computing environment in which two or more loosely-coupled programs operating on computers interconnected by means of a network are able to synchronize their operation to achieve a common goal. In such an environment, the two cooperating programs are considered to be "peers" with respect to computational capabilities—i.e., there is no distinction between "master" and "slave" processes, except for restriction which may be placed on the program by the application protocol. With cooperative processing, one computer can start a process on another computer, which second computer then operates without requiring any interaction. In addition., a "client" processor can start or interact with an active process on another computer which is acting as a "server". Typically, the client would request data, and the server will provide it; however, in some applications, the roles of client and server may alternate during the course of processing. The system of this invention utilizes such a cooperative processing environment to achieve its objectives.

Figure 2:
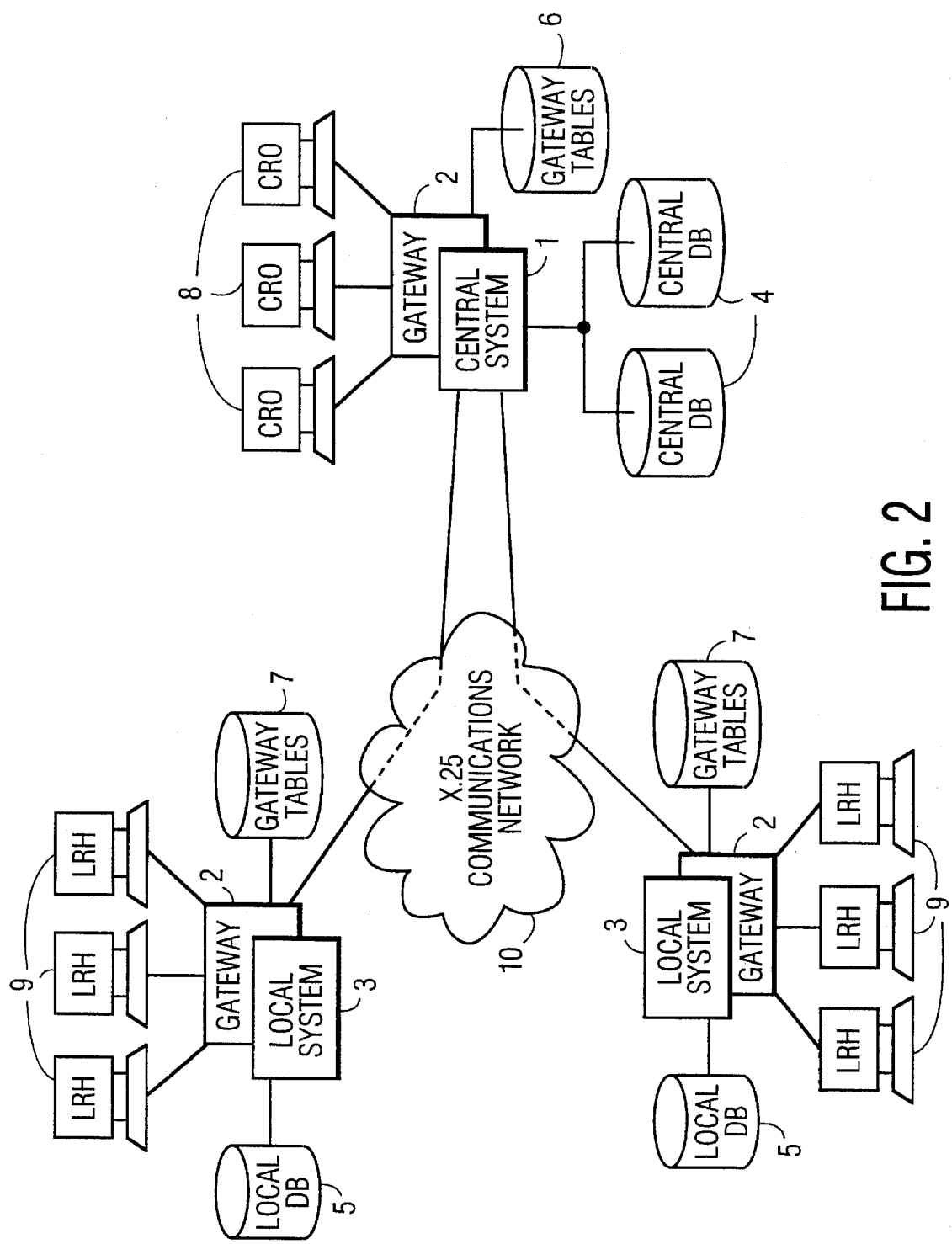
FIG. 2 illustrates a first order embodiment of the system of the invention.

In FIG. 2, an elemental configuration for the system of this invention is illustrated. As will be seen in that figure, a Central System 1, which in the preferred embodiment would comprise a main-frame computer, is connected to Central Database 4 and, through Gateway 2 and Communications Network 10, to one or more Local Systems 3. Such Local Systems, which in the preferred embodiment would comprise a mini-computer, may be connected to Local Database 5 for the storage of data specific to the local system. Local Systems 3 may also be connected to Terminals 9, which may be utilized for inputting data (such as local reservation and housekeeping data) to, or displaying data from the local system, and, via Local System 3 and Gateway 2, operates as an interface to other elements of the system of the invention. In an analogous manner, Central System 1 may be connected to one or more Terminals 8, such as terminals located in a central reservation office, for inputting data to the Central System and for displaying data from that system. Finally, Gateway Tables 7, located at each served location, provide storage for operating data used by Gateway 2.

In the preferred embodiment, the network interconnecting the Central System and the Local Systems will be based on System Network Architecture (SNA), and will utilize an X.25 packet-switched network to so interconnect those systems. Advanced Program-To-Program Communications (APPC) protocols, which are peer-to-peer communications protcols developed by IBM Corporation for use in SNA networks, are used to support cooperative processing among the central and local systems of the invention. As will be well known to those skilled in the art of this invention, the APPC protocol allows programs on computers located throughout a network to communicate in a large number of ways—e.g., multiple active "conversations" using whole duplex mode or single "conversations" using half duplex, with the sender and receiver coordinating their actions by means of APPC verbs.

The primary function of the gateway interface (2 of FIG. 2) is to impose order on the cooperative processing application design and to simplify the interface between application programs and the Logical Unit (LU) that supports APPC—i.e., the system facilities that handle the APPC functions. To that end, the invention incorporates a set of gateway routines to facilitate communications between application program in the central system and such programs in each of the local systems. Such functions are characterized generically as either a part of the Gateway Application Programming Interface (API) or the Gateway Service Routines (GSR).

API modules are a set of callable routines that will be linked with the application programs operating on the central and local systems. The API's make use of APPC routines to establish conversations with cooperating tasks. GSR's are time- or data-initiated transaction processing programs that provide general services to applications. Data is transferred to the GSR's by means of API calls. Application programs are shielded from the details of the communication interface, but have enough control to use the facilities in a manner that will provide the best possible response time. The major communications functions provided to the system by the API's and GSR's are listed in Table 1.

| | SERVICE | FUNCTION |
| --- | --- | --- |
| 1. | DATAGRAM/WAIT | Client sends message to server. Server responds with a single message. Client suspended during processing of response. |
| 2. | DATAGRAM/POST | Client sends message to server. Client continues to process until response is available. Single message transfer, test for receipt of response. |
| 3. | CONVERSATION | Bi-directional conversational mode processing. Send/Receive according to application-level protocol. |
| 4. | QUEUED PACKET DELIVERY (MAIL) | Application puts message in mail database by means of API. Mail is subsequently delivered to destination process by mail GSR. |
| 5. | BULK DATA TRANSFER (FILE TRANSFER) | Application puts "transfer this data" message in transfer database by means of API. Data is subsequently transferred by bulk transfer GSR. |

TABLE 1. GATEWAY FUNCTIONS

The Datagram/Wait function (Table 1: 1) allows an application program to send a message to a cooperating program on another computer and receive a reply. A single CALL to the Datagram API is all that is required to achieve the transfer of the two messages. However, while the communications process is active, the application will be suspended. The API handles the details of setting up and tearing down the conversation, building the appropriate header (with application-specified parameters), filling the buffers, and handling basic APPC errors. The application handles transaction-specific and non-retriable errors such as "host not available" or "data not found".

The Datagram/Wait function (along with the Datagram/Post function to be described shortly) represents the type of communications service known as "connectionless". To the API's involved in Datagram handling, there is, of course, a connection. However, from the perspective of the application, the details of that connection are not evident—i.e., the application simply calls a routine with a message and waits for a reply. There is no need to open the connection, send data, receive the response, and close the connection—this is all handled by a single call to the API. Hence, the service provides a very simple interface that can be used as an efficient method of requesting data from cooperating processes.

An example of using the Datagram/Wait function is described below:

1. A user (such as a reservations clerk) accessing a local system starts an application program to make a reservation for a member of the chains "frequent traveler club" (FTC).
2. The member supplies an FTC account number, and the system requires the member's account information (name, address, telephone, etc.) before the application can proceed further.
3. The application program formats a datagram which is a message that can be understood by a cooperating process running under the database interface on the server computer. The message contains the FTC number and a function code indicating that basic account information is to be retrieved and returned.
4. The application calls the datagram/wait API. The API module builds an appropriate message, allocates a conversation with the server, sends the data, requests a response and waits for the response.
5. The server database interface starts the cooperating application (identified by the local system application program, or "client"). That application retrieves the message sent from the client (by calling an appropriate API routine), interprets the function code ("READ FTC DATA", in this case), retrieves the data, formats a response, calls its API to send the message, and waits for a DEALLOCATE.
6. The client API receives the data from the server and confirms the DEALLOCATE request. The API returns the data to the application program with a return code indicating success.
7. The application interprets the return code. Since it indicates success, the data is displayed and the reservation process can proceed.

Note that the application program on the client side obtained the data with a single call to the API. The server side required two calls—one to retrieve the message from the client, and another to send its response. During this interval, the client process appeared to be suspended from the user's point of view.

In some cases, the task/process suspension for the application which is inherent in communication via the Datagram/Wait function will be unacceptable because the application could otherwise continue doing "useful" work while the server process is obtaining data and sending a response. To address this requirement, the Datagram/Post function (Table 1: 2) was created. While the Datagram/Post function is closely related to the Datagram/Wait function—i.e., both functions send a single message to a server process, and expect to receive a single message reply, the Datagram/Wait function forces the application to wait for such a response, whereas the Datagram/Post function allows the application to continue its operation without waiting for a response. The API can be called again at a later appropriate point to test if data is available, and if so to retrieve it. Because the Datagram/Post function represents a higher level of system overhead than the Datagram/Wait function, that function would ordinarily be used where the advantage in continued application processing during the communications sequence outweighed the "cost" of that additional system overhead.

An example of using Datagram/Post function is presented below:

1. A user accessing a local system starts an application program to make a reservation for an FTC member.
2. The member supplies an FTC number, and the system needs the member's account information (name, address, telephone, etc.), but can proceed with other processing while that information is obtained.
3. The application program formats a datagram which is a message that can be understood by a cooperating process running under the database interface on the server. The message contains the FTC number and a function code indicating that basic account information is to be retrieved and returned.
4. The application calls the datagram/post API. The API module builds an appropriate message, allocates a conversation with the server, sends the data, requests a response, and returns to the application.
5. The application program does other useful work, such as building another datagram to retrieve availability information for another property. This datagram can also be "fired-off" without waiting for the result of the FTC lookup. From the application's point of view, this effectively allows for "parallel processing" or at least multi-tasking within the unit of work.
6. The server database interface starts the cooperating application (identified by local system application program, or "client"). The application retrieves the message sent from the client (by calling an appropriate API routine), interprets the function code ("READ FTC DATA", in this case), retrieves the data, formats a response, calls its API to send the message, and waits for a DEALLOCATE.
7. The client application gets to a point where it cannot proceed without the FTC account information. At this point it calls the API to read the data, and waits for the API to RETURN. Note that the client application could test to see if the data was available using the cmtest API, which immediately returns to the application with an indication of whether or not data is available on the posted conversation. If not, the application can do something useful, such as displaying a "Data not yet available" message for the user.
8. The client API receives the data from the server and DEALLOCATEs the conversation. The API returns the data to the application program with a return code indicating success.
9. The application interprets the return code. Since it indicates success, the data is displayed and the reservation process can proceed.

In this example, the application program on the client side was not suspended for the duration of the server side operation. This will give the impression of better response time, and allow for a more functional user interface.

Under the Conversation function (Table 1: 3), cooperating applications are able to send and receive multiple messages within the boundary of a single conversation. The exchange of messages will be under control of an application-level protocol. Conversational mode processing is the most flexible of the services provided by the gateway interface. Therefore, it also puts the largest burden on the application programs with respect to using functions in an acceptable manner. Conversational mode processing is bi-directional. That is, during a single conversation, the direction of data flow can change an unlimited number of times.

A simple example of using Bi-Directional Conversational Mode Processing (BDCMP) is presented below. This is an example where the client sends a single message to the server, requesting a set of records in response. The server sends back an application-specified maximum number of records. Such a scenario will support transactions that need to display a set of data to the user for selection of a single record (account).

1. A user accessing a local system starts an application program to make a reservation for an FTC member.
2. The member does not know his or her FTC number, and the system must therefore retrieve a list of numbers for members with the same name. The user enters the member's name, which will be used as the key in an SQL SELECT statement. The application program detects that the FTC number field is empty (or contains a special value indicating that the person is a member, with an unknown account number) and therefore does not send a datagram requesting account information.
3. The application program formats a message that can be understood by a cooperating process running under the database interface on the server. The message contains the member's name and a function code indicating that a list of FTC numbers and related account information is to be retrieved and returned.
4. The application calls the cmopen API. The API starts a conversation with its partner program on the server and returns to the application.
5. The application calls the cmsemd API with the message requesting a list of account information. Presumably, the message will also indicate the maximum number of accounts that the client can handle in this conversation. The API module builds an appropriate message, sends the data, and returns to the application.
6. The application program does other useful work, such as building a datagram to retrieve availability information for another property. This datagram can also be "fired-off" without waiting for the result of the account lookup.
7. The server database interface starts the designated cooperating application. The application retrieves the message sent from the client, interprets the function code ("READ LIST OF ACCOUNTS BASED ON NAME", in this case), retrieves the data, formats a response, calls its API to send the message, and waits for a SEND indicator from the client. (At this point the client is the sender in the conversation, and the server must wait for permission to send. Alternatively, the server could issue a REQUEST-TO-SEND.)
8. The client application gets to a point where it cannot proceed without the account information. At this point, it calls the API (cmrecv) to read the data, and waits for the API to RETURN. The API will issue a PREPARE-TO-RECEIVE to tell the server that it can send. Then the client will wait for a message. The server will send the first message.
9. The client (local-system side) API receives a message and returns the data to the application. The application interprets the data, and determines that the server has more data. (The returned function code from the server will indicate that there is more data.) Hence, it calls the cmrecv API again.
10. The message is returned to the application and interpreted as before. This loop continues until either the server tells the client (by means of an application-level protocol) that there is no more data, or until the client has all the data it needs.
11. The client has all the data it is going to get and therefore calls the cmclose API to end the conversation. This is an application-layer function—an "END OF DATA" function code is used by the cooperating application programs to signal that there is no more data.
12. The server receives an application-level "close" message and returns it to the application. The application, having finished its work, performs a DEALLOCATE by calling the cmdeal API, which deallocates the conversation and "closes" its connection to the APPC subsystem.
13. The application displays the list of data and the user presumably selects the correct account. The account information is retrieved from an array, and the process continues.

Conversational mode processing will be useful in cases where sets of data, such as a list of accounts or properties, must be obtained from the server. During conversational mode processing a "virtual circuit" is open between the client and the server.

The Queued Packet Delivery (MAIL) function (Table 1: 4) is composed of an API and a set of GSR's. The API allows applications to transfer mail messages to the mail GSR which actually transfers the mail to a cooperating task on the remote system. Mail messages are similar to datagram messages. However, the mail API allows for several priority classes and for time-sensitive delivery. Hence, a mail message can be set at a high priority to be sent as soon as possible, or at a low priority to be sent at or after a designated time.

An example Queued Packet Delivery (Mail) scenario is presented below:

1. A user accessing a local system starts an application program to update account information.
2. The account information is retrieved from the server by means of a datagram service.
3. The account information is changed. A mail message is prepared. The message will be a transaction to cause the server database to reflect the changes.
4. The sendmail API is called with the message and other parameters (priority, time of delivery, etc.)
5. The sendmail API INSERTS a row into the mail table, using the supplied information.
6. The application COMMITS its work, which also COMMITS the mail.
7. The application ends, and the mail will be delivered to the specified task by the mail GSR. The mail GSR will use the datagram/wait function to transfer the message to the receiver.

The Bulk Data Transfer function (Table 1: 5) is used to send large amounts of relatively low-priority data between the local and the central systems. In sending bulk data, the application must prepare the file to be sent, and must then interact with the bulk data transfer API to schedule the delivery by the bulk data transfer GSR. Preparation of the data is purely a function of the application—i.e., the bulk data transfer routines are not concerned with the format or content of the data.

An example File Transfer scenario is presented below:

1. A user (or scheduler) accessing a local system starts an application program to prepare consumption data for the day.
2. The consumption data is prepared and multiple records are saved in a standard UNIX stream file.
3. The sendfile API is called with a message containing the file name and other parameters (processing application, priority, time of delivery, etc.)
4. The sendfile API INSERTS a row into the file transfer table, using the supplied information.
5. The application COMMITS its work.
6. The application ends, and the file will be delivered to the specified task by the bulkxfer GSR. Data will be sent in mutually agreed upon fixed or variable length blocks, and reassembled at the destination.

Figure 3:
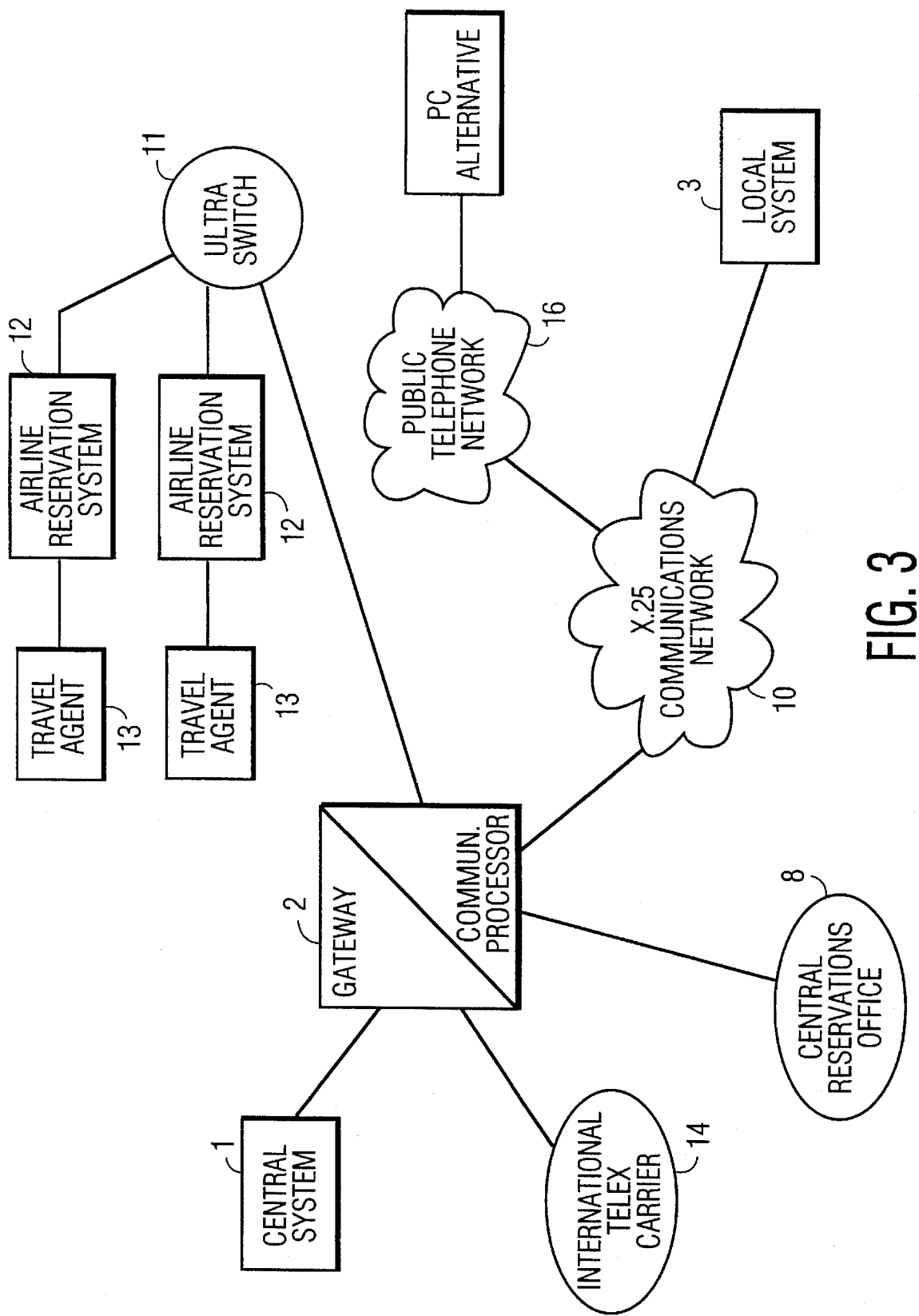
FIG. 3 illustrates the system of the invention with additional remote access functionality.

FIG. 3 illustrates an expanded embodiment of the system of the invention, along with additional functionality associated with the gateway interface. As will be seen in that figure, the Gateway 2 includes a communications processor function for controlling the communications links among the interconnected facilities of the system network. That communications processor functionality enables linkage between the Central System 1 and remote elements, such as Central Reservations Office 8, which are connected via dedicated communications lines, typically sized at 56 kilobits/sec or "T-1", as well as with elements such as Local System 3 which are interconnected via X .25 Switched Communications Network 10.

As will be further seen in FIG. 3, in addition to an interconnection among Central System 1, Local System 3 and Central Reservations Office 8, the system supports communications via Ultra Switch 11, which provides an interface between the system and a variety of a third party user groups, such as a Travel Agent 13 connected via an Airline Reservation System 12. Similarly, the system also supports connections to one or more International Telex Carriers 14, whereby access to the system can be obtained by a telex call, generally from overseas locations where the volume of communications with the system is insufficient to justify other modes of access.

A very important unit supported by the system of the invention is PC Alternative 15 of FIG. 3. The PC Alternative is a micro-computer programmed to emulate some, but not all, of the functionality of a Local System 3, that is usable to support access to the central system from remote sites, such as a smaller hotel, which do not generate sufficient data volume to economically justify the full functionality and associated full-time communications links of a Local System. With PC Alternative 15, access to the Central System only operates in one direction—from the PC Alternative to the Central System, and is initiated by a call placed from the PC Alternative through the Local Telephone Network 16 into a node of the X .25 Communications Network 10.

In operation, the scope of the data to be cooperatively processed and stored among the elements of the system is limited only by the applications operating on the processors of those elements. However, in a preferred embodiment, it is intended that the system will support at least the following processing/storage functions:

(1) The essential functionality, of course, is the management of inventory—room availability and reservations thereof, in the case of hotel inventory—for a number of geographically diverse locations. To that end, the system supports inquiry to or from the Central Database from or to databases associated with the various remote elements connected to the system network (except that in the case of the PC Alternative, the Ultra Switch and the International Telex Network, access is only available to the Central Database). Data available and supported for such inquiry includes room availability by date, by rate plan and by room type. Of course, the system supports booking of a particular reservation, later changes to or cancellation of such a reservation and, as well, arrangement of mailed confirmation of such a reservation. In addition, the system supports the maintenance of data on up to 24 room types per property, which may also be sequenced by rate plan.

Figure 4A:
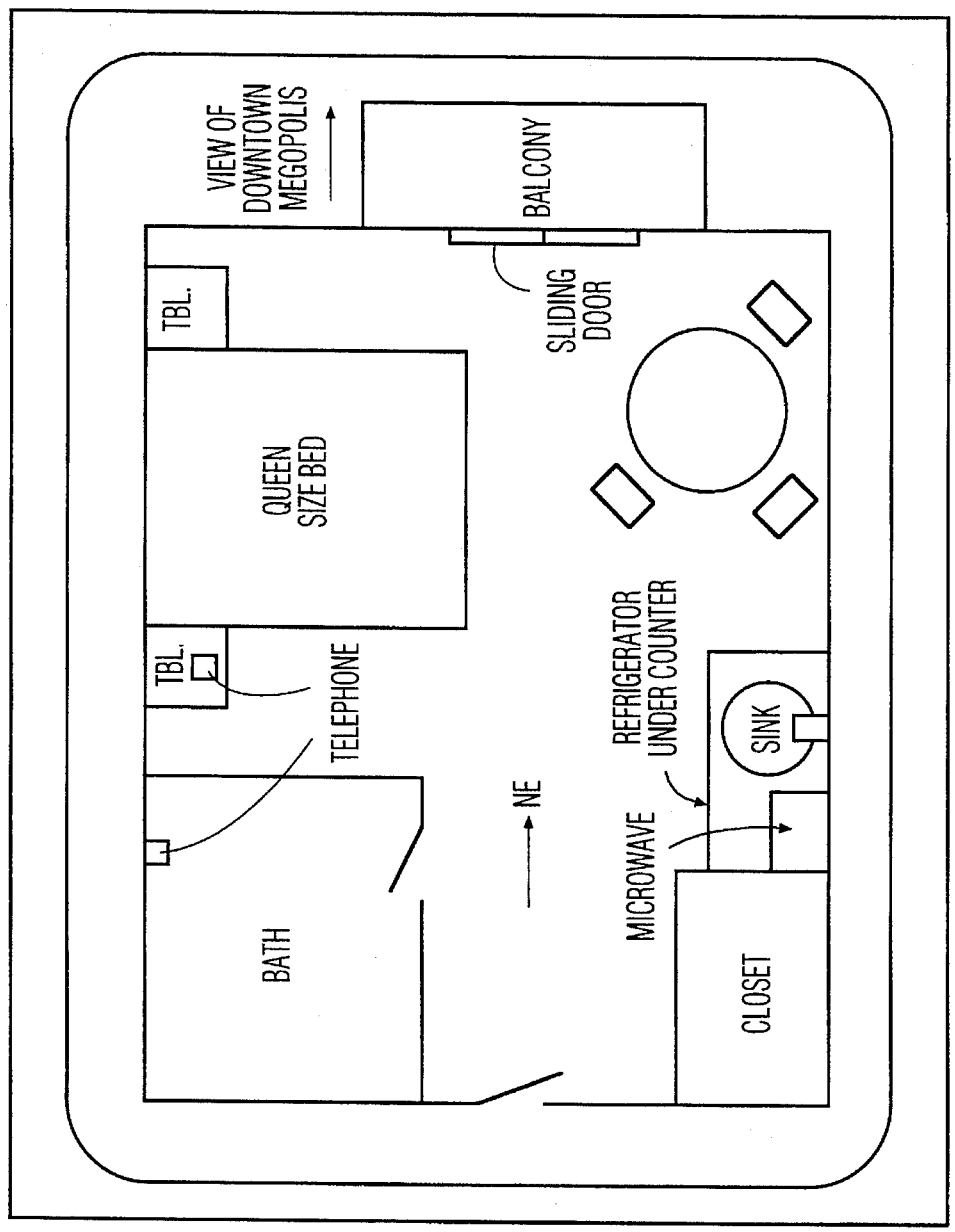
FIGS. 4 & 4A depict a typical operator terminal for use with the system and a blown-up view of the screen for such a terminal showing a display of room configuration data provided as one mode of operation for the system.
Figure 4:
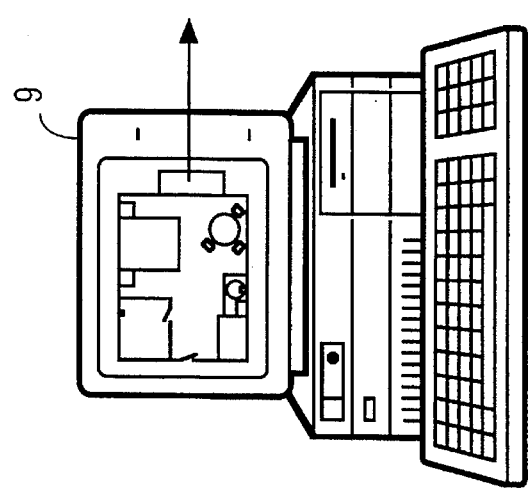

(2) A unique sales enhancement feature provided by the system is a terminal display where descriptions of each of the room types cataloged are available including, where requested, a graphical layout of each of the available room types showing specific features thereof (e.g., microwave oven, jacuzzi, wet bar), as well as describing direction of view and points of interest which can be viewed from the room. FIG. 4A depicts a blow-up of the screen for Terminal 9 shown in FIG. 4 illustrating such a room layout screen. The graphic file data representing such room layout data may be stored in either the local data base or the central data base and will be routed through the network of the system to the inquiring terminal in compressed form. Creation of such graphical files representing the various room layouts, as well as the compression of such data for transport across the network is accomplished using known software methods and applications.

(3) Additionally, a location functionality is available which permits the location of a property by city or metro area, by rate plan availability, and by property features and/or attributes. Similarly, the system supports, and can display for an operator, screens describing various facilities and amenities—such as golf courses, health clubs, restaurants, meeting/banquet rooms, etc.—available to the property, along with information on nearby points of interest, directions to the property from major highways and transportation hubs (e.g., airports), transportation alternatives for reaching the property, listings of places or events of interest and rental car availability.

(4) From a marketing perspective, a very important supported feature is the storage and retrieval by an operator (e.g., a reservation clerk) of account information for preferred accounts, such as members of a "frequent traveler club" maintained by such a hotel chain, accessible either by account number or member name. Similarly, the system supports the maintenance and availability of guest profile data for repeat guests, such as room preference and other special services desired by, or which should be made available to the guest, and guest-provided account data, such as credit card account data.

(5) An unlimited number of rate plans are supported, including up to 12 "seasons" per rate plan. The system further permits restricted access to the available rate plans so as to limit certain rate plans to being sold only via specific outlets, such as specific reservation offices and not company wide (e.g., from overseas locations only) and to associate specific rate plans with specific accounts, either at the corporate (i.e., chain) or the property level.

(6) The system supports a wide variety of inventory status and management functions, including particularly, the functionality of a single depleting inventory, i.e., for a reservation, the system removes the reserved room from inventory at both the central and local data base whether a reservation is taken through the central system or a local reservation option.

(7) Additionally, the system integrates completely with the administrative functionality incorporated into the local processors for servicing each of the local properties.

Herein, we have described a system and method for a novel and highly advanced data handling network which is ideally disposed for the management of inventory data among a number of dispersed locations, such as a hotel chain. Although the present embodiment of the invention has been described in detail, it should be understood that various changes, alterations and substitutions can be made therein without departing from the spirit and scope of the invention as defined by the appended claims.

What is claimed is:

1. In a hotel reservation system having a first set of application programs and a second set of application programs, a system for distributed hotel reservation database access and management, comprising:

(a) a central host computer having first data storage means for storing hotel data including room availability and customer account and material usage information for a plurality of hotels, and first processing means for interacting with the first set of application programs and for processing said hotel data;

(b) a plurality of local computers located remotely from said host computer, each having second data storage means for storing at least a portion of said hotel data, input means for an operator to enter input data into said local computer, second processing means for interacting with the second set of application programs and for processing said input data, and output means for displaying output data from said local computer to said operator;

(c) network means for linking said host computer and said plurality of local computers into a network, said host computer and said plurality of local computers having substantially symmetrical interfaces and operative to store similar data; and (d) gateway means associated with each computer in said network for linking the first set of application programs and the second set of application programs for enabling communication among cooperating tasks in the first set of application programs and the second set of application programs and for providing time- or data-initiated transaction processing services, wherein said means enables intercommunication and interprocessing among data management functions, as established by the first set of application programs and the second set of application programs, operating on at least two of said computers;

and wherein said gateway means operates to enable peer-to-peer communications between said at least two of said computers, whereby any one of said at least two of said computers is enabled to operate as server computer and any other one of said at least two of said computers is enabled to operate as a client computer, and further wherein interactive communications between said server computer and said client computer is enabled so that data and processing may be shared among said server and said client computers, said gateway means thereby operating to coordinate processing tasks among said functionally related applications in the first set of application programs and the second set of application programs and the flow of data between computers in said network.

2. The hotel reservation system according to claim 1, wherein said stored hotel data further includes room layout data, said data being displayable as a graphical replica of a room layout, and terminal means connected to said hotel reservation system via said network means and having display means associated therewith for displaying said data to enable a user of said system to describe the precise layout of any available room from said layout data.

3. The hotel reservation system according to claim 1, wherein said stored data further includes, rate information for said rooms, including unlimited rate plans.

4. The hotel reservation system according to claim 1, wherein said stored data further includes, a listing of restaurants, meeting rooms and special facilities for each of said plurality of hotels.

5. The hotel reservation system according to claim 1, wherein said stored data further includes, direction information for each of said hotels describing the distance from each hotel facility to nearby airports.

6. The hotel reservation system according to claim 1, wherein said stored data further includes, data indicative of available car leasing services at each of said hotels.

7. The hotel reservation system according to claim 1, wherein said stored data includes data indicative of places of interest near each of said hotel facilities.

8. The hotel reservation system according to claim 1, wherein said customer account data includes customer credit card numbers, addresses and type of room customer selected in the past.

9. The hotel reservation system according to claim 1, wherein said stored data includes promotional offering data indicative of special rates for predetermined periods of stay.

10. The hotel reservation system of claim 1 further including means for said client computer to send a message to said server computer, said server computer to respond thereto with a single message and said client computer to be disabled from further processing operations during a time interval associated with a processing by said server computer of its response to said client computer's message.

11. The hotel reservation system of claim 1 further including means for said client computer to send a message to said server computer, said server computer to send a response message to said client computer, and said client computer to continue its processing activities until a time of receipt form said server computer of its response message.

12. The hotel reservation system of claim 1 further including means for said client computer and said server computer to be enabled to communicate on an interactive basis between said client computer and said server computer.

13. The hotel reservation system of claim 1 further including means for a message from the application program operating on one of said computers to be sent to the application program operating on another of said computers wherein said message is accepted and stored by said another of said computers to be acted on by the receiving application at a time later than the transmission time thereof from the originating application.

14. The hotel reservation system of claim 1 further including means for a bulk transfer of data from one of said computers to another of said computers is enabled.

15. In a hotel reservation system having a set of host application programs accessing and maintaining a host database at a host location and a set of remote application programs accessing and maintaining a remote database at a remote location, a system for distributed hotel reservation database access and management, comprising:

a host computer system, at the host location, comprising:
  host processing means for executing the set of host application programs;
  host data storage means for storing the host database, wherein said means is responsive to said host processing means; and,
  host gateway means for communicating, wherein said means is responsive to said processing means;

a plurality of remote computer systems at remote locations comprising:

remote processing means for executing the set of remote application programs;

remote storage means for storing the remote database, wherein said means is responsive to said remote processing means; and, remote gateway means for communicating, wherein said means is responsive to said processing means;

network means for linking said host gateway means of said host computer system to said remote gateway means of said plurality of remote computer systems;

wherein said host gateway means operates in conjunction with said remote gateway means to enable the set of remote application programs to access the host database and to enable the set of host application programs to access the remote database.

16. The hotel reservation system according to claim 15, wherein the host database includes customer account information and customer history.

17. The hotel reservation system according to claim 15, wherein the remote database includes room inventory status, room type and room price information.

18. The hotel reservation system according to claim 15, wherein the remote database includes a room schematic layout in a predetermined digital graphic format.

19. The hotel reservation system according to claim 15, wherein the remote database includes a room picture in a predetermined digital graphic format.

20. The hotel reservation system according to claim 15 wherein said host gateway means in conjunction with a first remote gateway means at a first location and a second remote gateway means at a second location, operates to enable a first set of remote application programs at said first location to access a second remote database at said second location.

21. The hotel reservation system according to claim 15 wherein said host computer system further comprises an external gateway means for linking to an external computer network, wherein said means is responsive to said host processing means.

22. In a hotel reservation system having a set of host application programs at a host location and a set of remote application programs at a remote location, a system for distributed hotel reservation database access and management, comprising:

a host computer system at the host location comprising:
host processing means for executing the set of host application programs;
a host database;
host data storage means for storing said host database, wherein said means is responsive to said host processing means; and,
host gateway means for communicating, wherein said means is responsive to said processing means;

a plurality of remote computer systems at remote locations comprising:
remote processing means for executing the set of remote application programs;
a remote database;
remote storage means for storing said remote database, wherein said means is responsive to said remote processing means; and,
remote gateway means for communicating, wherein said means is responsive to said processing means;

network means for linking said host gateway means of said host computer system to said remote gateway means of said plurality of remote computer systems;

wherein said host gateway means operates in conjunction with said remote gateway means to enable the set of remote application programs to access said host database and to enable the set of host application programs to access said remote database.

23. The hotel reservation system according to claim 22, wherein the host database includes customer account information and customer history.

24. The hotel reservation system according to claim 22, wherein the remote database includes room inventory status, room type and room price information.

25. The hotel reservation system according to claim 22, wherein the remote database includes a room schematic layout in a predetermined digital graphic format.

26. The hotel reservation system according to claim 22, wherein the remote database includes a room picture in a predetermined digital graphic format.

27. The hotel reservation system according to claim 22 wherein said host gateway means in conjunction with a first remote gateway means at a first location and a second remote gateway means at a second location operates to enable a first set of remote application programs at said first location to access a second remote database at said second location.

28. The hotel reservation system according to claim 22 wherein said host computer system further comprises an external gateway means for linking to an external computer network, wherein said means is responsive to said host processing means.

* * * * *